F. M. FREEBURG.
ROLLER BEARING.
APPLICATION FILED OCT. 17, 1904.
922,124.
Patented May 18, 1909.
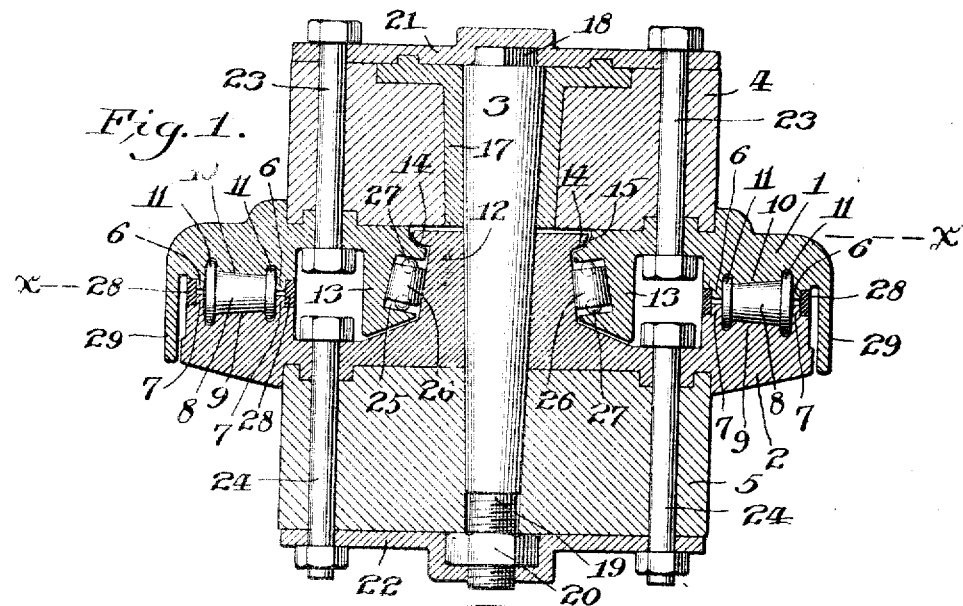
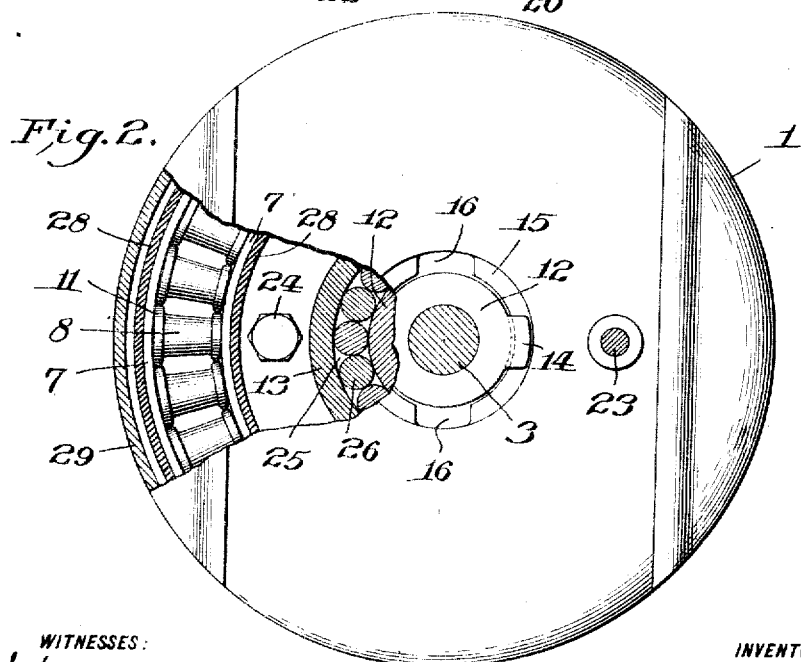
WITNESSES:
W. H. Canby
T. H. Gamble
INVENTOR
Frank M. Freeburg
BY
A. V. Groupe
ATTORNEY.

UNITED STATES PATENT OFFICE.

FRANK MARION FREEBURG, OF PHILADELPHIA, PENNSYLVANIA, ASSIGNOR TO KING FIFTH WHEEL COMPANY, OF PHILADELPHIA, PENNSYLVANIA, A CORPORATION OF PENNSYLVANIA.

ROLLER-BEARING.

No. 922,124.     Specification of Letters Patent.     Patented May 18, 1909.

Application filed October 17, 1904. Serial No. 228,908.

*To all whom it may concern:*

Be it known that I, FRANK MARION FREEBURG, a citizen of the United States, residing at Philadelphia, in the county of Philadelphia and State of Pennsylvania, have invented certain new and useful Improvements in Roller-Bearings, of which the following is a specification.

This invention relates to roller bearings of that class which are employed between the body of a car and its truck and which form the fifth wheel for vehicles generally.

In roller bearings provided with horizontal rollers which are employed to support the bodies of cars and vehicles generally, great difficulty has been experienced in preventing flat portions from wearing upon the rollers due to the slight forward and back motion of the surfaces engaged with the rollers when the car or vehicle is started or stopped or varies its speed of travel. Particularly is this the case when the rollers are supporting a great weight.

The object of my present invention is, to overcome this difficulty and to provide a roller bearing having advantages not heretofore attained.

The invention consists in the novel construction and combinations of parts which will be hereinafter fully described and claimed.

In the drawings—Figure 1 is a central vertical section through my improved roller bearing. Fig. 2 is a sectional plan view thereof, as on the line *x*—*x* of Fig. 1.

1 and 2 designate upper and lower circular bearing members, respectively, which are adapted to turn relatively to each other about the central or king bolt 3. The construction herein shown and described is particularly adapted for use in connection with railway cars, the member 1 being adapted to support the beam 4 of the car body and the member 2 being adapted to be supported by the beam 5 of the truck. The opposing faces of the members 1 and 2 near the outer edges thereof are provided with annular ribs 6 and 7, respectively, forming the side walls of oppositely disposed annular channels within which is arranged a series of conical rollers 8. These rollers 8 are adapted to roll freely upon an inclined bearing surface 9 on the member 2 and to receive the inclined bearing surface 10 of the member 1 to support the latter member. The respective ends of the rollers 8 are provided with flanges 11 which enter grooves formed in the members 1 and 2 adjacent to the sides of the bearing surfaces 9 and 10, as shown. The rollers 8 are arranged in close relation to each other and support the member 1 upon the member 2 in a manner to provide a very efficient antifriction bearing between said members or the car body and the car truck.

The lower member 2 is provided with an upwardly extending hub 12 which is fitted to and surrounds the bolt 3 and the upper member 1 is provided with a downwardly extending hub 13 which surrounds the hub 12, as shown. The top of the hub 12 is provided with two oppositely-disposed projections 14 which are fitted to and adapted to turn within an annular groove 15 formed in the top of the hub 13 and thereby prevent the axial movement of the members 1 and 2 away from each other and the consequent parting of the members 1 and 2 or the car body from the car truck, should the bolt 3 be accidentally broken.

In order to provide for the assembling and parting of the members 1 and 2 I extend through the inner wall of the hub 13 two oppositely-disposed vertical grooves 16 which are arranged on a line extending centrally and longitudinally of the car body, it being observed that the projections 14 are arranged on a line extending at right angles thereto. Thus it will be seen that by giving either of the members 1 or 2 a quarter turn or moving it at right angles to the position shown, the projections 14 will be moved into register with the grooves 16 and thus permit the assembling or parting of the members 1 and 2, as desired.

The king bolt 3 is made tapering and extends through correspondingly tapered openings in the beam 5, the hub 2 and a bushing 17 in the beam 4. Projecting from the upper end of the bolt 3 is a square head 18 and the lower end of the bolt is provided with a screw-threaded projection 19 to which is fitted a nut 20 adapted to take against the bottom of the beam 5 to hold the bolt in place. Arranged on top of the beam 4 and fitted to and surrounding the square head 18 is a plate 21, and arranged against the bottom of the beam 5 and fitted to and surrounding the nut 20 is a plate 22; the plate 21 being held in place by bolts 23 which secure the member 1 to the beam 4, and the plate 22 being held in place by bolts 24 which secure the member 2 to the beam 5. By removing the plate 22, the nut 20 may be adjusted to draw the bolt 3 to take up wear between the bolt and the parts engaged therewith. The plate 21 engaging the square head 18, serves to prevent the bolt 3 from turning during the turning of the nut 20. After the bolt has been adjusted and the plate 22 replaced, the latter, engaging the nut, serves as a locking device to prevent the nut from working loose.

The inner face of the hub 13 is provided with an annular channel 25 in which is arranged a circular series of conical rollers 26, the axis of the roller converging toward a central point above the series. These rollers 26 bear against the inclined base of the groove 25 and the inclined outer face of the hub 12, the inclined base of the groove 25 and the inclined face of the hub 12 both converge toward the same point with the rollers 26. The respective ends of the rollers 26 are socketed for the reception of balls 27 which take against the upper and lower walls of the groove 25 and thus prevent endwise motion of the rollers.

In order to prevent the accumulation of dust etc. within the channels for the rollers 8 I provide the adjacent edges of the ribs 6 and 7 with annular grooves to which are fitted rings 28 of felt or other suitable material which cover the spaces between the ribs 6 and 7; and in order to still further prevent the accumulation of dirt etc. I provide the outer edge of the member 1 with a downwardly extending annular flange 29 which covers the horizontal space between the members 1 and 2.

I claim—

1. A center bearing for railway cars comprising upper and lower bearing members having interlocking means to hold the members against vertical separation and intermediate anti-friction devices, said interlocking means being separable when one of said bearing members is turned to an abnormal position.

2. A center bearing for railway cars comprising upper and lower bearing members having integral interlocking flanges to hold the members against vertical separation, and intermediate anti-friction devices, said interlocking flanges being separable when one of said members is turned to an abnormal position.

3. A center bearing for railway cars comprising upper and lower bearing members and intermediate anti-friction devices said bearing members having oppositely extending flanges, said flanges being provided with integral angular projecting parts arranged to interlock in order to prevent the vertical separation of the bearing members, said interlocking parts being separable when one of said members is turned to an abnormal position.

In testimony whereof I affix my signature in presence of two witnesses.

FRANK MARION FREEBURG.

Witnesses:
RALPH H. GAMBLE,
A. V. GROUPE.